US010283136B1

(12) United States Patent
Wurmfeld (10) Patent No.: US 10,283,136 B1
(45) Date of Patent: May 7, 2019

(54) DOPPLER MICROPHONE PROCESSING FOR CONFERENCE CALLS

(71) Applicant: CAPITAL ONE SERVICES, LLC, McLean, VA (US)

(72) Inventor: David Kelly Wurmfeld, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/056,739

(22) Filed: Aug. 7, 2018

Related U.S. Application Data

(63) Continuation of application No. 16/019,480, filed on Jun. 26, 2018.

(51) Int. Cl.
| | |
|---|---|
| *H04M 1/64* | (2006.01) |
| *G10L 21/0208* | (2013.01) |
| *G10K 11/178* | (2006.01) |
| *H04R 1/32* | (2006.01) |

(Continued)

(52) U.S. Cl.
CPC ........ *G10L 21/0208* (2013.01); *G10K 11/178* (2013.01); *H04M 3/56* (2013.01);
(Continued)

(58) Field of Classification Search
CPC .................................................. G10L 21/0208
(Continued)

(56) References Cited

U.S. PATENT DOCUMENTS 9,426,300 B2 * 8/2016 Kim ...................... H04S 7/306
9,584,758 B1 * 2/2017 Chen ...................... H04N 7/147
(Continued)

FOREIGN PATENT DOCUMENTS

WO    WO 2010000878 A2 *  1/2010  ............ H04R 3/02

OTHER PUBLICATIONS

International Standard Organization ISO 3382-2 Acoustics—Measurement of room acoustic parameters—Part 2: Reverberation time in ordinary rooms, and Technical Corrigendum I, Jun. 15, 2008 (24 pages).

(Continued)

*Primary Examiner* — Md S Elahee
(74) *Attorney, Agent, or Firm* — Finnegan, Henderson, Farabow, Garrett & Dunner, LLP (57) ABSTRACT

Systems and methods are provided for conducting conference calls using doppler-based, i.e., reverberation-based techniques. The embodiments comprise a call device performing operations to join a call session hosted on a session server; receive sensor data comprising an audio signal from a first microphone and location information associated with the first microphone; determine a reverberation parameter associated with the location information; generate a first processed audio signal based on the audio signal and the reverberation parameter; and transmit the first processed audio signal to the session server. The session server may perform operations to receive a respective processed audio signal; determine a sound quality parameter of the respective processed audio signal; generate a balanced audio signal based on the sound quality parameter and the received processed audio signal; and transmit the balanced audio signal to a remote call device belonging to a second party.

19 Claims, 7 Drawing Sheets

(51) Int. Cl.
*H04R 3/04* (2006.01)
*H04M 3/56* (2006.01)

(52) U.S. Cl.
CPC .............. *H04R 1/326* (2013.01); *H04R 3/04* (2013.01); *G10H 2210/281* (2013.01); *G10L 2021/02082* (2013.01)

(58) Field of Classification Search
USPC .......... 379/67.1, 93.21, 158, 202.01, 205.01, 379/207.01; 348/14.03; 381/63, 66; 704/246, 500
See application file for complete search history.

(56) References Cited

U.S. PATENT DOCUMENTS

| | | | |
|---|---|---|---|
| 9,865,274 B1* | 1/2018 | Vicinus | G10L 19/20 |
| 2003/0202667 A1* | 10/2003 | Sekine | G10H 1/0091 381/63 |
| 2009/0182563 A1* | 7/2009 | Schobben | H04S 1/005 704/500 |
| 2016/0180852 A1* | 6/2016 | Huang | G10L 17/005 704/246 |
| 2017/0171685 A1* | 6/2017 | Ballard | H04S 7/303 |
| 2017/0303053 A1* | 10/2017 | Falch | G10L 21/02 |
| 2017/0344339 A1* | 11/2017 | Molesky | G06F 3/0485 |
| 2018/0190310 A1* | 7/2018 | Li | G01H 7/00 |
| 2018/0262859 A1* | 9/2018 | von Schultzendorff | H04R 27/00 |

OTHER PUBLICATIONS

International Standard Organization ISO 3382-2 Acoustics—Measurement of room acoustic parameters—Part 2: Reverberation time in ordinary rooms—Technical Corrigendum I, Apr. 15, 2009 (2 pages).

* cited by examiner

DOPPLER MICROPHONE PROCESSING FOR CONFERENCE CALLS

This application is a continuation of U.S. patent application Ser. No. 16/019,480, filed on Jun. 26, 2018, which is hereby incorporated by reference in the present application.

BACKGROUND

Many people conduct conference calls involving multiple participants or multiple parties for business or other purposes. Often, conventional conference call systems have poor sound quality. Some participants may be difficult to hear loudly or dearly due to their distance from a microphone, background noise, sound absorption in the room, or interference from reverberation in the room. As a result, the intelligibility of speech may be diminished. In addition, conventional conference call systems may not be adaptable to various ambient conditions. For example, a number of occupants may enter or leave a room, ambient background may increase during the call, or windows or doors may open or close. Further, traditional systems often have limited mobility, i.e., they cannot be easily moved to new locations within a room or to new rooms. Another drawback is that many conventional systems are costly.

One conventional system for conducting conference calls involves a dedicated conference call unit comprising a microphone and a speaker located somewhere in a room. A system comprising a dedicated conference call unit may use a telephone system protocol or an internet-based protocol to route calls between parties. This conventional system may suffer from poor sound quality, and it may be costly. Further a conventional dedicated conference call unit may take up valuable space on, for example, a table in a meeting room. In addition, a dedicated conference call unit may have limited mobility and may be unable to adapt to changing ambient conditions.

Another example of a conventional system for conducting conference calls involves using an array of microphones in a room. For example, each user might have a dedicated microphone that the user turns on and off when speaking or listening, respectively. Alternatively, an array of passive microphones may be installed in the room. While arrays of microphones may improve the ability to capture audio from each participant in some cases, they are often costly. Further, an array of microphones may have limited mobility and may be unable to adapt to changing ambient conditions.

Alternatively, another conventional system for conducting conference calls involves using mobile phones, personal computers, tablets, or other user devices to conduct conference calls. For example, a participant may use a cell phone in speaker-mode to allow several co-located participants to join the conference call. This system is often less expensive and more mobile than dedicated conference call systems. However, conference calls conducted with user devices often suffer from poor sound quality, and this system may be unable to adapt to changing ambient conditions.

In addition to the problems described above, many conventional systems do not address the so-called "cocktail party problem," in which the speech of at least one of multiple competing participants is identified against a backdrop of noise.

In view of the shortcomings and problems with traditional methods of stripping sensitive data, an improved and unconventional system and method for conducting conference calls with better audio quality and increased speech intelligibility, improved mobility, greater adaptability, and low cost is desired.

SUMMARY

The disclosed embodiments provide methods and systems for conducting conference calls using methods that expand upon the Doppler effect, e.g., based on reverberation methods to improve audio quality, increase speech intelligibility, improve mobility, increase adaptability, and lower cost. Thus, the unconventional disclosed embodiments provide enhancements to conventional conference call systems and methods. The disclosed systems and methods are implemented using a combination of conventional hardware and software as well as specialized hardware and software, such as a machine constructed and/or programmed specifically for performing functions associated with the disclosed method steps.

Consistent with the present embodiments, a system comprising a call device performing operations to join a call session hosted on a session server is disclosed. The call device may be configured to receive sensor data comprising an audio signal from a first microphone and location information associated with the first microphone. Further, the call device may be configured to determine a reverberation parameter associated with the location information, generate a first processed audio signal based on the audio signal and the reverberation parameter, and transmit the first processed audio signal to the session server. The session server may perform operations to determine a sound quality parameter of the respective processed audio signal. The session server may generate a balanced audio signal based on the sound quality parameter and the received processed audio signal, and transmit the balanced audio signal to a remote call device belonging to a second party.

Consistent with the present embodiments, a method is disclosed. The method may comprise receiving sensor data comprising an audio signal from a first microphone of a user device and location information associated with the first microphone. Further, the method may comprise determining a reverberation parameter associated with the location information, generating a first processed audio signal based on the audio signal and the reverberation parameter, and transmitting the first processed audio signal to a conference call session server. The method may comprise determining, at the conference call session server, a sound quality parameter of the respective processed audio signal. The method may further comprise generating a balanced audio signal based on the sound quality parameter and the received processed audio signal, and transmitting the balanced audio signal to a remote call device belonging to a second party.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Disclosed embodiments improve the audio quality of conference calls and ability to adapt to changing ambient conditions while increasing the conference call system mobility and decreasing costs. To achieve these improvements in conference call systems and methods, the disclosed embodiments comprise joining a call session hosted on a session server; receiving sensor data comprising an audio signal from a first microphone and location information associated with the first microphone; determining a reverberation parameter associated with the location information; generating first processed audio signal based on the audio signal and the reverberation parameter; and transmitting the first processed audio signal to the session server.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
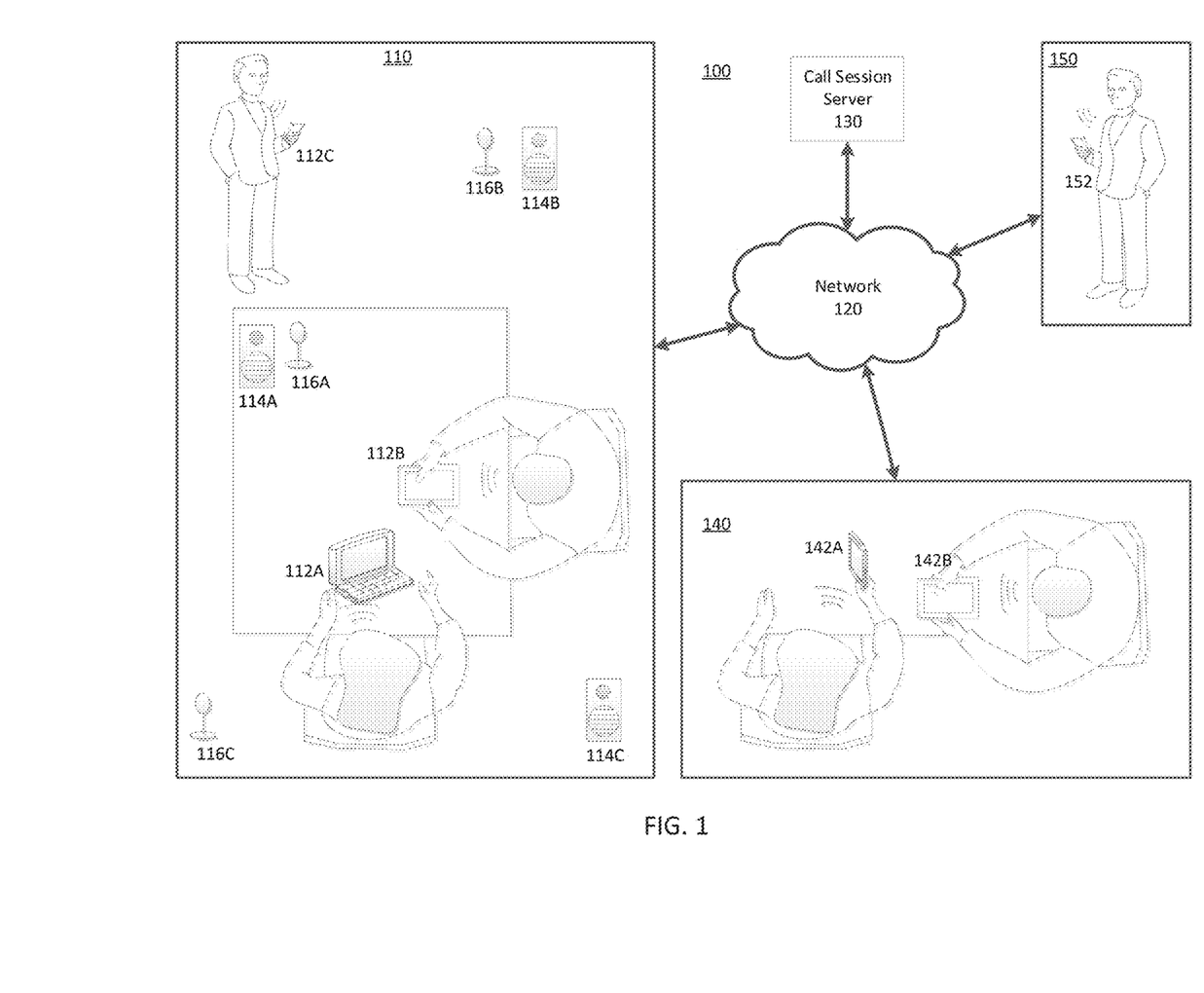
FIG. 1 is a diagram of an exemplary system environment for conducting conference calls.

FIG. 1 is a diagram of an exemplary system environment for conducting conference calls using methods based on the Doppler effect, i.e., based on reverberation methods. In particular, FIG. 1 depicts a diagram of exemplary system 100, consistent with disclosed embodiments, revealing some technical aspects of the present disclosure for achieving the intended results of the present disclosure. System 100 is an example of a system for conducting conference calls between multiple parties and call participants using reverberation audio processing techniques on call devices. By using reverberation methods and other signal processing methods to process audio signals on call devices, the embodiments allow for improved audio quality, adaptability, system mobility, and lower costs.

Consistent with disclosed embodiments, it is to be understood that audio signal may refer to an analog signal or a digital signal.

As shown in FIG. 1, system 100 may include a plurality of parties 110, 140, and 150; user devices 112A, 112B, 112C, 142A, 142B, and 152; and dedicated devices 114A, 114B, 114C, 116A, 116B, and 116C. A user device may be, for example, a mobile phone, a personal computer, a tablet, or the like. A dedicated device may be, for example, a conference call phone device or other device used to make conference calls. The user devices and dedicated devices are herein referred to, collectively, as call devices. Call devices are connected to call session server 130 through network 120. Consistent with disclosed embodiments, call devices are configured to perform at least one of transmitting an audio signal to call session server 130 or receiving an audio signal from call session server 130.

FIG. 1 is an exemplary configuration of system 100. As will be appreciated by one skilled in the art, the components and arrangement of components included in system 100 may vary. For example, as compared to the depiction in FIG. 1, system 100 may include a larger or smaller number of parties, participants, user devices, dedicated devices, networks, or session servers. In addition, system 100 may further include other components or devices not depicted that perform or assist in the performance of one or more processes consistent with the disclosed embodiments. The components and arrangements shown in FIG. 1 are not intended to limit the disclosed embodiments, as the components used to implement the disclosed processes and features may vary.

Referring to FIG. 1, call participants with user devices 112A-C are members of party 110 and may be co-located in a room or other space. User devices 112A-C are connected to call session server 130 through network 120. User devices 112A-C may be configured to employ reverberation methods and other audio signal processing methods.

As depicted in FIG. 1, an array of dedicated devices 114A-C comprising a respective speaker may be located in the space. Further, an array of dedicated devices 116A-C comprising a respective microphone may be located in the space. Dedicated devices 114A-C and 116A-C may be configured to employ reverberation methods and other audio signal processing methods.

In the example of FIG. 1, dedicated devices 114 and 116 may be independent devices or may be components of the same device. For example, dedicated device 114A, comprising a speaker, and dedicated device 116A, comprising a microphone, may be components of a speaker-phone device that rests on a table in a conference room. Alternatively, dedicated device 114C, comprising a speaker, may be mounted on a wall in a conference room, while dedicated device 116C, comprising a microphone, may be mounted on a ceiling. Dedicated devices 114A-C and 116A-C may be connected to call session server 130 through network 120. As will be appreciated by one skilled in the art, the embodiments may comprise other arrangements.

Still referring to FIG. 1, the arrangement of call devices of party 110 comprise a number of sound source positions (i.e., speaker positions), a number of microphone positions, and a set of all possible sound source-microphone combinations. In some embodiments, the sound source-microphone combinations may be more than one, and preferably more than 5, and even more preferably more than 11.

In exemplary system 100, call participants with user devices 142A and 142B are members of party 140 and are co-located in the same room or other space. User devices 142A-B are connected to call session server 130 through network 120. User devices 142A-B may be configured to employ reverberation methods and other audio signal processing methods. As one of skill in the art will appreciate, party 140 may comprise other devices comprising at least one of a microphone or a speaker.

In exemplary system 100, the call participant with user device 152 is the only member of party 150 and is connected to call session server 130 with a mobile phone. User device 152 may be configured to employ reverberation methods and other audio signal processing methods. As one of skill in the art will appreciate, party 150 may comprise other devices comprising at least one of a microphone or a speaker.

As depicted in FIG. 1, participants may use a variety of user devices 112A-C, 142A-B, and 152 to join a conference call session, such as personal computers, mobile devices, smartphones, tablets, or the like. In some embodiments, the user devices comprise a microphone and a speaker. In other embodiments, the user device is connected to at least one of a remote microphone or a speaker. Multiple participants may share devices to join the session. For example, a participant may put a mobile phone in speaker mode so that multiple members of a call party may listen and speak during the conference call.

Consistent with disclosed embodiments, call devices, including user devices 112A-C, 142A-B, and 152 may use reverberation techniques and other signal processing methods to improve audio quality during the session.

In some embodiments, call devices, including user devices 112A-C, 142A-B, and 152, and dedicated devices 114A-C, 116A-C, may use audio compression techniques prior to transmitting signals to call session server 130. For example, call devices may use Advanced Audio Coding (AAC), MP3, Windows Media Audio® or other audio compression formats.

In some embodiments, call devices transmit and receive computer files to and from session server 130. In some embodiments, call devices stream a screen share of a call device to or from session server 130.

As will be appreciated by one of skill in the art, call devices, including user devices 112A-C, 142A-B, and 152, and dedicated devices 114A-C, 116A-C, may comprise a video camera or may be connected to a remote video camera. Call devices may transmit video signals to call session server 130 during a call session. In some embodiments, video signals may be compressed using a video codec including, for example, MPEG-4, MPEG-2, a Lossless codec, or other video codec.

In the embodiment of system 100, network 120 may be a public network or private network. Network 120 may be, for example, a wired or wireless network, including, without limitation, a Local Area Network, a Wide Area Network, a Metropolitan Area Network, an IEEE 802.11 wireless network (e.g., "Wi-Fi"), a network of networks (e.g., the Internet) or the like. Call devices, including user devices 112A-C, 142A-B, and 152, and dedicated devices 114A-C, 116A-C, may connect to call session server 130 through network 120. In some embodiments, network 120 may be secure and require a password to access the network.

Still referring to FIG. 1, call session server 130 is connected to network 120 and may be configured to host a session comprising parties 110, 140, and 150. Call session server 130 comprises a memory unit and one or more processor. As one of skill in the art will appreciate, call session server 130 may represent a plurality of servers working collaboratively to initiate and host a call session. The memory units and processors of call session server 130 may not be geographically proximate; that is, call session server 130 may be on a cloud service that uses various data centers to manage network traffic. Call session server 130 is configured to receive requests to initiate a session from call devices and is further configured to host a session that route calls between call devices. Consistent with disclosed embodiments, call session server 130 is configured to receive audio signals from call devices and apply signal processing techniques to the received audio signals. In some embodiments, call session server 130 is configured to receive video signals from call devices.

The components of system 100 may use an international standard for creating, modifying, and terminating sessions with one or more participants. For example, system 100 may use Session Initiation Protocol (SIP), which is an application-layer control (signaling) protocol, or the International Telecommunication Union protocol H.323 for call signaling and control, multimedia transport and control, and bandwidth control for point-to-point and multi-point conferences. As will be appreciated by one of skill in the art, system 100 may use other protocols.

Figure 2:
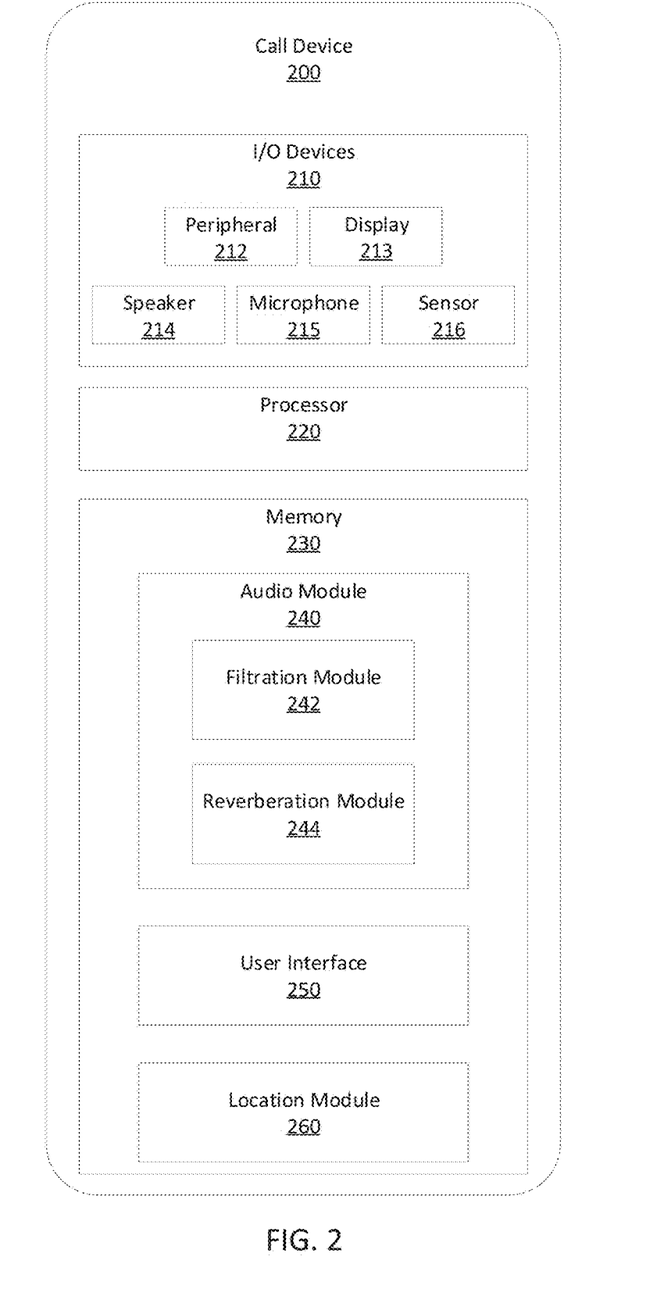
FIG. 2 is a diagram of an exemplary user device, consistent with disclosed embodiments.

FIG. 2 is a diagram of an exemplary user device 200, consistent with disclosed embodiments.

Call device 200 may be one of exemplary user devices 112A-C, 142A-B, 152, or dedicated devices 114A-C, 116A-C of FIG. 1. Consistent with disclosed embodiments, a user device may be one of a mobile phone, a personal computer, a tablet, or the like. A dedicated device may be one of a dedicated conference call phone device or other device used to make conference calls.

Referring in greater detail to FIG. 2, call device 200 may comprise one or more input/output ("I/O") devices 210, one or more processors 220, and one or more memory units 230 for storing programs or applications and data. Consistent with disclosed embodiments, exemplary memory unit 230 comprises an audio module 240, a user interface 250, and a location module 260. As one of skill in the art will appreciate, the components and arrangement of components of call device 200 may vary. I/O devices 210 may include one or more devices that allow call device 200 to send and receive information or interactions from a user or another device. For example, I/O devices 220 may comprise various input/output devices, including at least one of a peripheral 212, a display 213, a speaker 214, a microphone 215, and a sensor 216.

Peripheral 212 may comprise a keyboard, a mouse-type device, a gesture sensor, an action sensor, a physical button, switch, microphone, touchscreen panel, stylus, keyboard, a mouse, a trackpad, a call button, a dial pad, a volume button, a mute button, a focus button, a zoom button, a camera button, a haptic feedback device, etc., that may be manipulated by user to input information or may be used to communicate feedback to a user.

In some embodiments, I/O devices 210 may comprise display 213 comprising a light emitting component, such as an LED or other component capable of providing a visible signal to a user. In some embodiments, display 213 comprises at least one of a monitor, an LCD display, an LED display, a touch screen, a light, a projector, or another electronic display.

I/O devices 210 may also include an audio output device, such as speaker 214 configured to provide sound and audio feedback to a user operating call device 200. In some embodiments, speaker 214 may be a component of call device 200. Alternatively, speaker 214 may be a remote device, and call device 200 may be configured to send audio signals to remote speaker 214. For example, call device 200 may be connected via Bluetooth® or Wi-Fi to speaker 214. Alternatively, call device 200 may be connected via one or more cables to a system or a device comprising speaker 214.

In some embodiments, speaker 214 is one of an omni-directional speaker, a speaker configured to sweep an area by rotating, a headset, a wired speaker, or a wireless speaker.

In some embodiments, microphone 215 may be a component of call device 200. Alternatively, microphone 215 may be a remote device, and call device 200 may be configured to receive audio signals from remote microphone 215. For example, call device 200 may be connected via Bluetooth® or Wi-Fi (or another short-range wireless protocol) to microphone 215. Alternatively, call device 200 may be connected via one or more cables to a system or a device comprising microphone 215.

In some embodiments, microphone 215 is one of an omni-directional microphone, a microphone configured to sweep an area by rotating, a headset microphone, a remote wired microphone, or a wireless microphone.

In some embodiments, sensor 216 comprises at least one of a Global Positioning System (GPS) sensor, a gyroscope, an accelerometer, a magnetometer, an altimeter, or other sensor. Further, sensor 216 may comprise an environmental sensor, including at least one of a light sensor, a pressure sensor, or other sensor that detects changes in ambient conditions. Sensor 216 may be a component of call device 200 or a remote sensor. As one of skill in the art will appreciate, sensor 216 is exemplary and there may be more than one sensor associated with call device 200.

I/O devices 210 may also include one or more communication modules (not shown) for sending and receiving information from other components in system 100 by, for example, establishing wired or wireless connectivity between call device 200 and network 120. Exemplary communication modules as I/O devices 210 may include, for example, a short-range or near-field wireless communication modem, a Wi-Fi communication modem, or a cellular communication modem.

Call device 200 may include one or more processors 220, which may be known computing processors, including a microprocessor from the Snapdragon™ family manufactured by Qualcomm™, the Exynos™ family manufactured by Samsung™, or any of various processors manufactured by Apple™, for example. Processor 220 may constitute a single-core or multiple-core processor that executes parallel processes simultaneously. For example, processor 220 may be a single core processor configured with virtual processing technologies. In certain embodiments, processor 220 may use logical processors to simultaneously execute and control multiple processes. Processor 220 may implement virtual machine technologies, or other known technologies to provide the ability to execute, control, run, manipulate, store, etc., multiple software processes, applications, programs, etc. In another embodiment, processor 220 may include a multiple-core processor arrangement (e.g., dual core, quad core, etc.) configured to provide parallel processing functionalities to allow call device 200 to execute multiple processes simultaneously. One of ordinary skill in the art would understand that other types of processor arrangements could be implemented that provide for the capabilities disclosed herein. The disclosed embodiments are not limited to any type of processor(s) configured in call device 200. Processor 220 may execute various instructions stored in call device 200 to perform various functions of the disclosed embodiments described in greater detail below.

Call device 200 may include a memory 230, which may be a volatile or non-volatile, magnetic, semiconductor, optical, removable, non-removable, or other type of storage device or tangible (i.e., non-transitory) computer-readable medium. Memory 230 may store one or more programs used, for example, in audio module 240, user interface 250, or location module 260. Programs may include operating systems (not shown) that perform known operating system functions when executed by one or more processors. Disclosed embodiments may operate and function with computer systems running any type of operating system.

As depicted in FIG. 2, memory 230 comprises audio module 240, user interface 250, and location module 260.

Audio module 240 comprises a filtration module 242 and a reverberation module 244. Audio module 240 and its component modules comprise a set of instructions executable by a processor and stored on one or more memory units of call device 200.

Filtration module 242 comprises a suite of audio processing programs, scripts, applications, or other audio processing tools to improve sound quality during conference calls and increase the intelligibility of speech. For example, filtration module 242 may comprise audio processing tools that use at least one of time-domain filters, frequency domain filters, spectral noise reduction, adaptive noise cancellation, adaptive broadband filtration, adaptive inverse filtration, frequency compensation, impulse filtration, dynamic processing, stereo processing, automatic gain control, acoustic shock protection, harmonic filters, or equalizer control, to improve sound quality. Further, in some embodiments, filtration module 242 may comprise audio processing tools that adjust a sound quality parameter. For example, filtration module 242 may be configured to adjust at least one of a loudness, a pitch, and a timbre. One of ordinary skill in the art will appreciate that filtration module 242 may comprise still other audio processing tools to improve sound quality and increase speech intelligibility.

Reverberation module 244 comprises a suite of programs, scripts, applications, or other audio processing tools to measure at least one aspect of reverberation in a space and to process an audio signal based on the measured aspect of reverberation. In some embodiments, reverberation module 244 may be configured to allow call device 200 to use interrupted noise method or integrated impulse response method to measure reverberation time. As an illustrative example, reverberation module 244 may comprise methods disclosed in International Standard Organization (ISO) standard 3382-2:2008(E) titled Reverberation Time In Ordinary Rooms.

For example, by executing instructions stored in reverberation module 244, call device 200 may generate a tone using a sound source or speaker, receive a returned audio signal via a microphone, and estimate a reverberation parameter. Further, based on instructions in reverberation module 244, call device 200 may receive an audio signal at microphone 215 and generate a processed audio signal based on the audio signal and the reverberation parameter. One of ordinary skill in the art will appreciate that reverberation module 244 may comprise other methods of measuring reverberation and processing audio signals based on reverberation. As previously described, the sound-source used to generate the tone may be speaker 214.

In some embodiments, by executing instructions stored in reverberation module 244, call device 200 may generate a tone comprising at least one of a broadband random noise, a pseudo-random electrical noise, a pistol-shot noise, a spark gap impulse, a noise burst, a chirp, an impulse noise, a pink noise, an exponential seep, a sinusoidal sweep, or other noise. In some embodiments, call device 200 may send commands to a remote device to generate the tone. In some embodiments, the frequency range of the tone may cover 250 Hz to 2,000 Hz, or preferably 125 Hz to 2,000 Hz, or more preferably 100 Hz to 4,000 Hz in octave bands or 100 Hz to 5,000 Hz in one-third-octave bands. In some embodiments, the sound source is configured to produce a sound pressure level sufficient to ensure a decay curve at least 35 dB and preferably 45 dB above background noise.

Consistent with disclosed embodiments, reverberation module 244 may receive a returned audio signal at microphone 215. Further, reverberation module 244 may estimate a reverberation parameter based on the returned audio signal. The reverberation parameter may comprise at least one of a decay curve or a reverberation time. For example, the reverberation parameter may be at least one of the time for the returned signal to decay below 5 dB and 25 dB below the initial level, or 5 dB and 35 dB below, or 5 dB and 65 dB below ($T_{20}$, $T_{30}$, or $T_{60}$, respectively). In some embodiments, reverberation module 244 shall use at least one of exponential averaging or linear averaging of decay.

Referring back to FIG. 2, call device 200 may comprise location module 260. Consistent with disclosed embodiments, the location module may comprise a suite of programs, scripts, applications, or other audio processing tools to estimate at least one of a position of call device 200, a remote microphone, or a remote speaker. Location module 260 may receive sensor input from sensor 216. Location module 260 may estimate a position based on GPS data, gyroscope data, accelerometer data, altimeter data, magnetometer data, a Bluetooth® signal strength, a Wi-Fi signal strength, or a cellular network signal strength. Location module 260 may estimate the position of call device 200 relative to other devices in the room. Location module 260 may estimate the position of call device 200 relative to a previous position of call device 200. As one of skill in the art will appreciate, location module 260 may comprise other components and methods to estimate the position of call device 200.

Still referring to FIG. 2, call device 200 may comprise user interface 250. User interface 250 is configured to accept user inputs, the inputs comprising commands to conduct conference calls. User inputs may comprise inputs from at least one of a touch screen, a keyboard, a mouse, a trackpad, a call button, a dial pad, a microphone button, a sound setting button, or another input device. User interface 250 may comprise icons, fields, or simulated input devices.

In some embodiments, user interface 250 is configured to allow the user to perform operations comprising at least one of initiating a conference call session, placing a call, adding a party to call session, joining a call session, dropping a party from a call session, disconnecting from a call session, terminating a call session. In some embodiments, user interface 250 is configured to allow the user to perform operations comprising at least one of adjusting a volume, changing a microphone sensitivity, muting a microphone, turning a camera on or off, focusing a camera, zooming a camera, or adjusting another call setting. In some embodiments, user interface 250 is configured to allow the user to perform operations comprising at least one of changing a noise filtration setting, updating a reverberation parameter, or canceling a reverberation update.

In some embodiments, call device 200 is configured to perform at least one of transmitting and receiving audio signals to and from call session server 130. Further, in some embodiments, call device 200 may be configured to transmit at least one of a sound quality parameter of an audio signal, a reverberation parameter, and a location of call device 200 to call session server 130.

Figure 3:
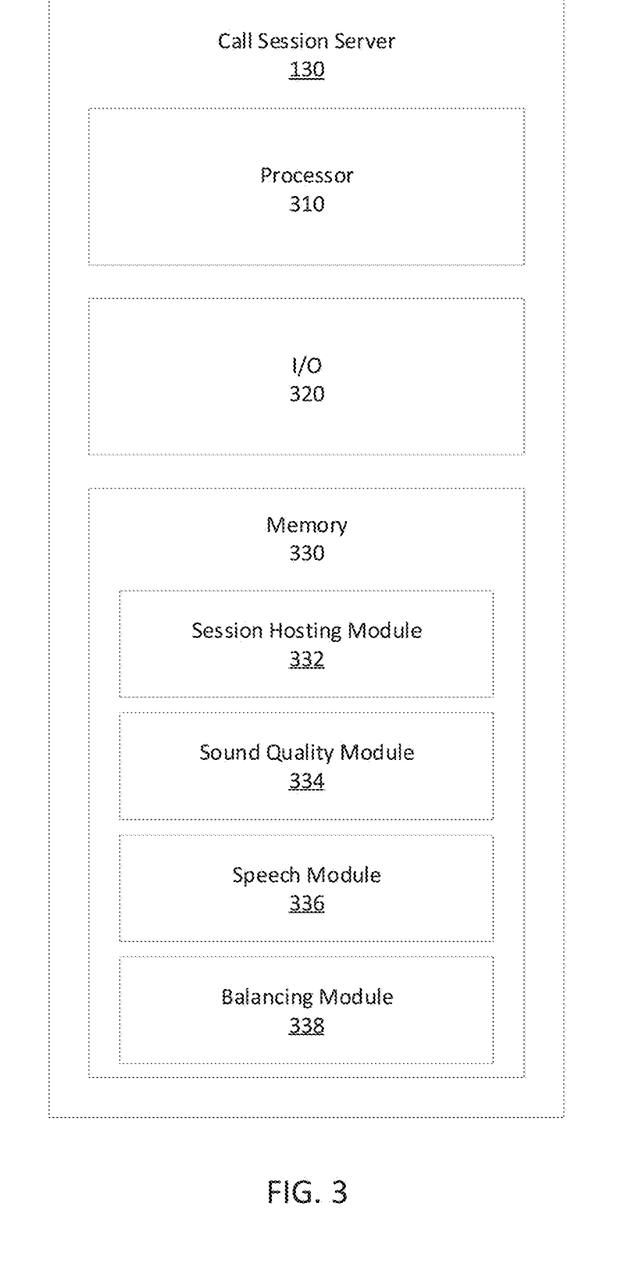
FIG. 3 is a diagram of an exemplary session server, consistent with disclosed embodiments.

FIG. 3 is a diagram of an exemplary session server, consistent with disclosed embodiments. Referring in greater detail to FIG. 3, consistent with disclosed embodiments, exemplary call session server 130 is configured to host a call session between multiple parties over a network. The call session comprises audio signals transmitted between parties and may further comprise video signals transmitted between parties. Call session server 130 is configured to receive and transmit audio signals from and to call device 200. Further, in some embodiments, call session server 130 is configured to receive from and transmit to call device 200 at least one of a sound quality parameter of an audio signal, a reverberation parameter, and a location of a call device 200.

In some embodiments, call session server 130 may be on a single server, a cluster of servers configured for parallel processing, multiple server clusters, or a cloud service. Call session server 130 may be hosted on a private or public network and may further be on a cloud. As one of skill in the art will appreciate, other arrangements are possible, consistent with disclosed embodiments.

As shown in FIG. 3, call session server 130 comprises one or more processors 310, one or more I/O devices 320, and a memory 330. Memory 330 may include at least one of session hosting module 332, sound quality module 334, balancing module 338, or speech module 336.

Processor 310 may be one or more known or custom processing devices designed to perform functions of the disclosed methods, such as a single core or multiple core processors capable of executing parallel processes simultaneously. For example, processor 310 may be a single core processor configured with virtual processing technologies. In certain embodiments, processor 310 may use logical processors to simultaneously execute and control multiple processes. Processor 231 may implement virtual machine technologies, or other known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

Call session server 130 may include one or more storage devices configured to store information used by processor 310 (or other components) to perform certain functions related to the disclosed embodiments. In one example, call session server may include memory 330 that includes instructions to enable processor 310 to execute one or more applications, such as server applications, a call hosting application, a messaging application, an electronic transaction application, an account status application, network communication processes, and any other type of application or software known to be available on computer systems. Alternatively or additionally, the instructions, application programs, etc., may be stored in an internal database or external storage (not shown) in direct communication with call session server 130, such as one or more databases or memory accessible over network 120. A database or other external storage may be a volatile or non-volatile, magnetic, semiconductor, tape, optical, removable, non-removable, or other type of storage device or tangible (i.e., non-transitory) computer-readable medium.

In one embodiment, call session server 130 may include memory 330 that includes instructions that, when executed by processor 310, perform one or more processes consistent with the functionalities disclosed herein. Methods, systems, and articles of manufacture consistent with disclosed embodiments are not limited to separate programs or computers configured to perform dedicated tasks. For example, call session server 130 may include memory 330 that may include one or more programs to perform one or more functions of the disclosed embodiments, including the functions performed by session hosting module 332, sound quality module 334, speech module 336, and balancing module 338. Moreover, processor 310 may execute one or more programs located remotely from system 100. For example, call session server 130 may access one or more remote programs, that, when executed, perform functions related to disclosed embodiments. Referring to FIG. 3, memory 330 may comprise session hosting module 332, sound quality module 334, speech module 336, and balancing module 338.

Session hosting module 332 is configured to host a conference call session between multiple parties. Session hosting module 332 may be configured to route calls following at least one of a telephone system protocol or an internet-based protocol. For example, session hosting module may use Session Initiation Protocol (SIP), which is an application-layer control (signaling) protocol, or the International Telecommunication Union protocol H.323 for call signaling and control, multimedia transport and control, and bandwidth control for point-to-point and multi-point conferences. As will be appreciated by one of skill in the art, session hosting module 332 may use other protocols.

In some embodiments, session hosting module 332 may be configured to perform at least one of initiating a call session in response to a user request, placing a call to a party, allowing a party to join a call session, adding a party to an ongoing call session, dropping a party from a call session, or terminating a call session. Session hosting module 332 may send a notification to a call party, the notification comprising at least one of a call status, a user availability status, or a user message. Session hosting module 332 may reroute calls dynamically based on at least one of a network condition or a change in a user network address. As will be appreciated by one of skill in the art, session hosting module 332 may be configured to execute other procedures (e.g., programs, applications, routines, scripts) to carry out the function of hosting call sessions between multiple parties.

In some embodiments, session hosting module 332 is configured to transmit and receive data to and from at least one of sound quality module 334, speech module 336, and balancing module 338.

As shown in FIG. 3, sound quality module 334 is configured to receive data streams comprising audio signals from call devices and is further configured to perform audio processing operations on received audio signals. Sound quality module 334 may process audio signals in addition to any audio processing performed by filtration module 242. In some embodiments not depicted in FIG. 3, sound quality module 334 may determine an audio quality parameter of a received audio signal and, based on the audio quality parameter, apply audio processing tools to improve sound quality during conference calls and increase the intelligibility of speech.

Sound quality module 334 comprises a suite of audio processing programs, scripts, applications, or other audio processing tools to improve sound quality during conference calls and increase the intelligibility of speech, including audio processing tools previously disclosed with reference to sound quality module 334. For example, sound quality module 334 may comprise audio processing tools that use at least one of time-domain filters, frequency domain filters, spectral noise reduction, adaptive noise cancellation, adaptive broadband filtration, adaptive inverse filtration, frequency compensation, impulse filtration, dynamic processing, stereo processing, automatic gain control, acoustic shock protection, harmonic filters, or equalizer control. One of ordinary skill in the art will appreciate that the sound quality module may comprise still other audio processing tools to improve sound quality and increase speech intelligibility.

In some embodiments, sound quality module 334 is configured to transmit and receive data to and from at least one of session hosting module 332, speech module 336, and balancing module 338.

As shown in FIG. 3, call session server 130 may comprise speech module 336. Speech module 336 is configured to receive data streams comprising audio signals from call devices and is further configured to perform audio processing operations on received audio signals. Speech module 336 comprises a suite of audio processing programs, scripts, applications, or other audio processing tools to increase the intelligibility of speech. Speech module 336 may further comprise audio processing tools to recognize speech and convert speech to text.

In some embodiments, to increase the intelligibility of speech, speech module 336 is configured to perform, on audio signals received from one or more call devices, at least one of a linear filtration, a probabilistic filtration, an Independent Component Analysis, or other signal processing methods to enhance the sound quality of speech.

Further, in some embodiments, speech module 336 is configured to identify a speech component of an audio signal received from a call device. For example, speech module 336 may be configured to recognize speech by applying at least one of a logistic regression model, a Naïve Bayes and Sentiment Classification-based model, a Hidden Markov Model (HMM), dynamic time warping-based speech recognition, a neural network, a deep learning neural network, an end-to-end automatic speech recognition, and the like. In some embodiments, speech module 336 is configured to associate a plurality of speech components with respective call participants. Further, in some embodiments, speech module 336 is configured to generate transcribed text based on recognized speech and transmit the transcribed text to a call device.

In some embodiments, speech module 336 is configured to transmit and receive data to and from at least one of session hosting module 332, sound quality module 334, and balancing module 338.

Referring again to FIG. 3, balancing module 338 may comprise a suite of audio processing programs, scripts, applications or other audio processing tools to mix and balance sound between more than one audio signal.

In some embodiments, balancing module 338 receives a plurality of audio signals from a plurality of respective call devices and mixes the audio to generate a balanced or composite audio signal. Balancing module 338 selects one or more of the received audio signals and generates a balanced audio signal based on the selected audio signals.

In exemplary embodiments, balancing module 338 may generate a balanced audio signal using at least one of automatic level control, sound clipping, gain adjustment, a microphone array processing method, or other audio mixing method. For example, balancing module 338 may use a microphone array processing method comprising spherical harmonic array processing (phase-mode processing), source extraction, dereverberation, delay-and-sum microphone array processing, direction of arrival estimation, time difference of arrival estimation. As one of skill in the art will appreciate, balancing module 338 may use other methods of mixing audio signals.

In some embodiments, balancing module 338 may generate a balanced audio signal based on location data received from a call device. For example, balancing module 338 may generate a balanced audio signal of a based on the position of a microphone associated with a call device. Balancing module 338 may generate a balanced audio signal based on sound intensity data. For example, balancing module 338 may generate a balanced audio signal by applying echolocation techniques.

In some embodiments, balancing module 338 may generate a multi-channel balanced audio signal comprised of at least two of a left speaker, a right speaker, a center speaker, a front speaker, a rear speaker, and another surround sound speaker. Further, balancing module 338 may generate a balanced signal using a method of reproducing 3D sound fields based on the location of sound sources and further based on the location of speakers associated with call devices of a receiving party.

In some embodiments, balancing module 338 may generate a balanced audio signal based on a speech component received from speech module 336. For example, balancing module 338 may select one or more audio signals based on a speech component and increase or decrease the relative loudness of the selected one or more audio signal in the balanced signal.

In some embodiments, the balanced audio signal is based on at least one of a sound quality parameter received from a call device and a sound quality parameter received from sound quality module 334. For example, balancing module 338 may select one or more audio signals based on a received sound quality parameter and increase or decrease the relative loudness of the selected audio signal.

In some embodiments, balancing module 338 may generate a balanced audio signal based on dereverberation techniques. For example, balancing module 338 may use a reverberation parameter received from a call device. In some embodiments, balancing module 338 may apply at least one of spatial coherence methods, time dependent coherent-to-diffuse power ratio methods, frequency dependent coherent-to-diffuse power ratio methods, and other dereverberation techniques to generate a balanced audio signal.

Figure 4:
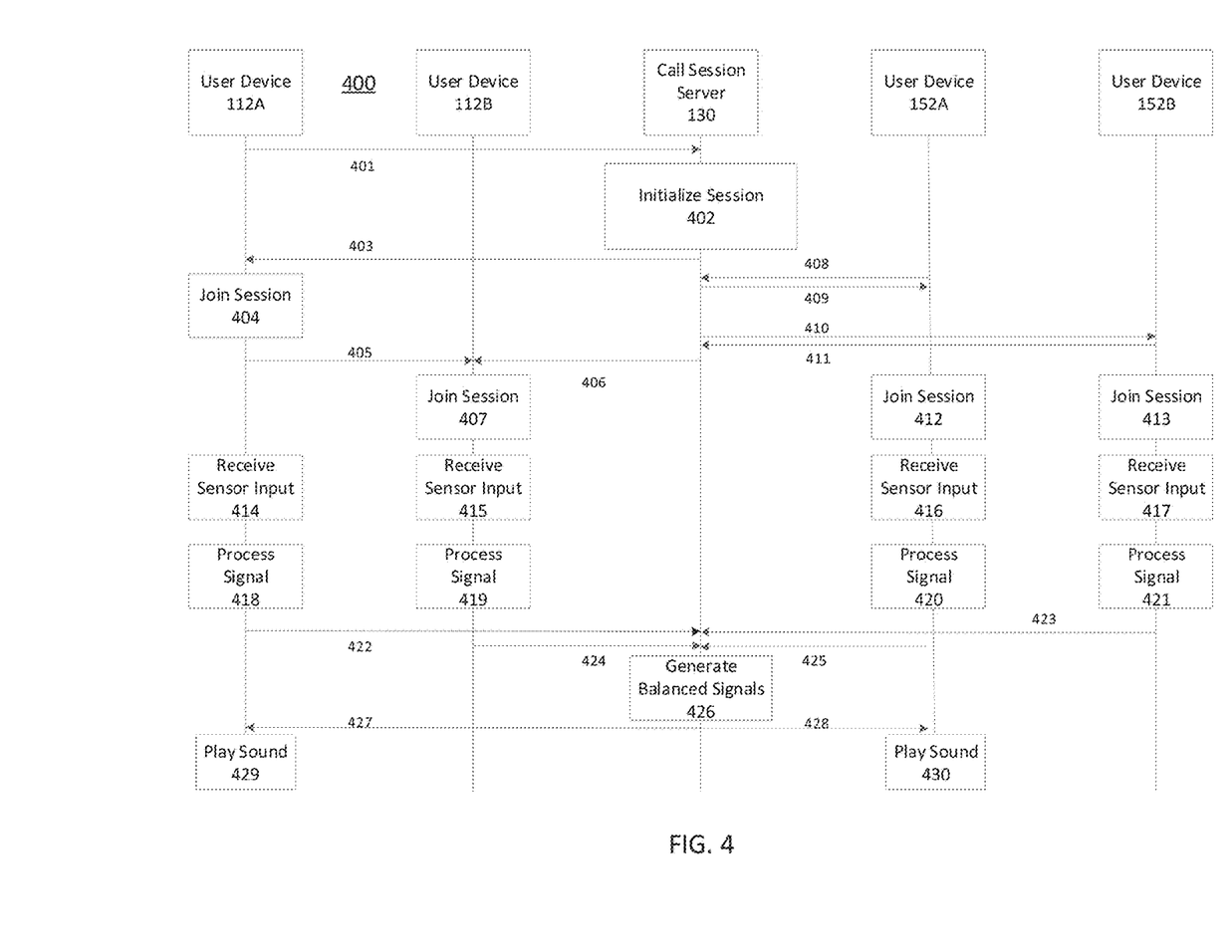
FIG. 4 depicts exemplary operations in a process for providing conference calls.

FIG. 4 depicts exemplary operations in process 400 for providing conference calls.

In the example of FIG. 4, consistent with disclosed embodiments, user devices 112A-B may be used by a first party in a first location, and user devices 152A-B may be used by a second party in a second location, wherein the first and second party participate in a conference call hosted by call session server 130. For simplicity, FIG. 4 illustrates two parties comprised of two call devices, but, as will be appreciated by one of skill in the art, more or fewer call devices or parties may participate in the conference call.

At step 401, user device 112A transmits a request via a network to initialize a call session. In some embodiments, the request may comprise call session information including at least one of a session phone number, a session IP address, and a session URL. In some embodiments, the message may comprise host account information including at least one of a host user ID, a password, or a payment method. In some embodiments, the request may comprise at least one of contact information associated with a member of the first party and contact information associated with a member of the second party. Contact information may comprise at least one of a user ID, a phone number, an IP address, and an email address.

At step 402, call session server 130 initializes the call session in response to the request. Initializing the call session may comprise establishing a channel and determining a path to route a call between parties.

At step 403, call session server 130 transmits call session information to user device 112A, the call session information comprising at least one of an invitation to join a session, a dial-in number, or a URL.

At step 404, user device 112A joins the session in response to receiving call session information from call session server 130.

At step 405, user device 112A transmits call session information to user device 112B. In response, at Step 407, user device 112B joins the session.

At step 406, as an alternative to step 405, call session server 130 transmits call session information to user device 112B and, at step 407, user device 112B joins the session in response.

In some embodiments, at optional step 408, user device 152A transmits a request to call session server 130, and, at step 409, receives call session information from call session server 130 in response to the request. Alternatively, step 408 is not performed, and at step 409 call session server 130 transmits call session information to user device 152A based on contact information received at step 401.

At step 412, user device 152A joins the call session.

In some embodiments, at optional step 410, user device 152B transmits a request to call session server 130, and, at step 410, receives call session information from call session server 130 in response to the request. Alternatively, step 410 is not performed, and at step 410 call session server 130 transmits call session information to user device 152B based on contact information received at step 401 or at step 408.

At step 413, user device 152B joins the session.

At step 414, user device 112A receives sensor inputs. Consistent with disclosed embodiments, sensor inputs may comprise an audio signal and location information. For example, user devices may receive sensor input comprising methods disclosed referring to audio module 240 and location module 260.

At step 415, user device 112B receives sensor inputs. Consistent with disclosed embodiments, sensor inputs may comprise an audio signal and location information. For example, user devices may receive sensor input comprising methods disclosed referring to audio module 240 and location module 260.

At step 416, user device 152A receives sensor inputs. Consistent with disclosed embodiments, sensor inputs may comprise an audio signal and location information. For example, user devices may receive sensor input comprising methods disclosed referring to audio module 240 and location module 260.

At step 417, user device 152B receives sensor inputs. Consistent with disclosed embodiments, sensor inputs may comprise an audio signal and location information. For example, user devices may receive sensor input comprising methods disclosed referring to audio module 240 and location module 260.

Steps 414-417 may further comprise determining a reverberation parameter using, for example, methods discussed above in reference to reverberation module 244.

At step 418, user device 112A processes received audio signals and generates respective processed audio signals. In some embodiments, at step 418, user device 112A performs methods disclosed referring to filtration module 242 and reverberation module 244.

At step 419, user device 112B processes received audio signals and generates respective processed audio signals. In some embodiments, at step 419, user device 112B performs methods disclosed referring to filtration module 242 and reverberation module 244.

At step 420, user device 152A processes received audio signals and generates respective processed audio signals. In some embodiments, at step 420, user device 152A performs methods disclosed referring to filtration module 242 and reverberation module 244.

At step 421, user device 152B processes received audio signals and generates respective processed audio signals. In some embodiments, at step 421, user device 152B performs methods disclosed referring to filtration module 242 and reverberation module 244.

At step 422 user devices 112A transmits respective processed audio signals to call session server 130.

At step 423 user device 152A transmits respective processed audio signals to call session server 130.

At step 424 user device 112B transmits respective processed audio signals to call session server 130.

At step 425 user device 152B transmits respective processed audio signals to call session server 130.

At step 426, call session server 130 generates a balanced signal corresponding to each party by performing methods disclosed referring to FIG. 3, including balancing module 338. In some embodiments, at step 426, balancing module 338 receives a plurality of audio signals from a plurality of respective call devices and mixes the audio to generate a balanced or composite audio signal. For example, balancing module 338 may select one or more of the received audio signals and generate a balanced audio signal based on the selected audio signals. In some embodiments, the balanced audio signal is based on at least one of a first processed audio signal or a second processed audio signal. In some embodiments, the balanced audio signal may be further based on at least one of a first sound quality parameter of the first processed audio signal or a second sound quality parameter of the second processed audio signal. In some embodiments, the balanced audio signal may be based on a speech component At steps 427 and 428, call session server 130 transmits, to a call device associated with one party, a balanced audio signal corresponding to the opposite party. In the example of FIG. 4, call session server 130 transmits a balanced audio signal corresponding to the second party to each of user device 112A. Further, in the example of FIG. 4, call session server 130 transmits a balanced audio signal corresponding to the first party to user device 152. As one of skill in the art will appreciate, other embodiments are possible in which more than one call device associated with a party receives a balanced audio signal.

At step 429, user device 112A plays a sound on one or more speakers based on the balanced signal corresponding to the second party. Playing a sound may comprise methods disclosed referring to FIG. 2.

At step 430, user device 152A plays a sound on one or more speakers based on the balanced signal corresponding to the first party. Playing a sound may comprise methods disclosed referring to FIG. 2.

Figure 5A:
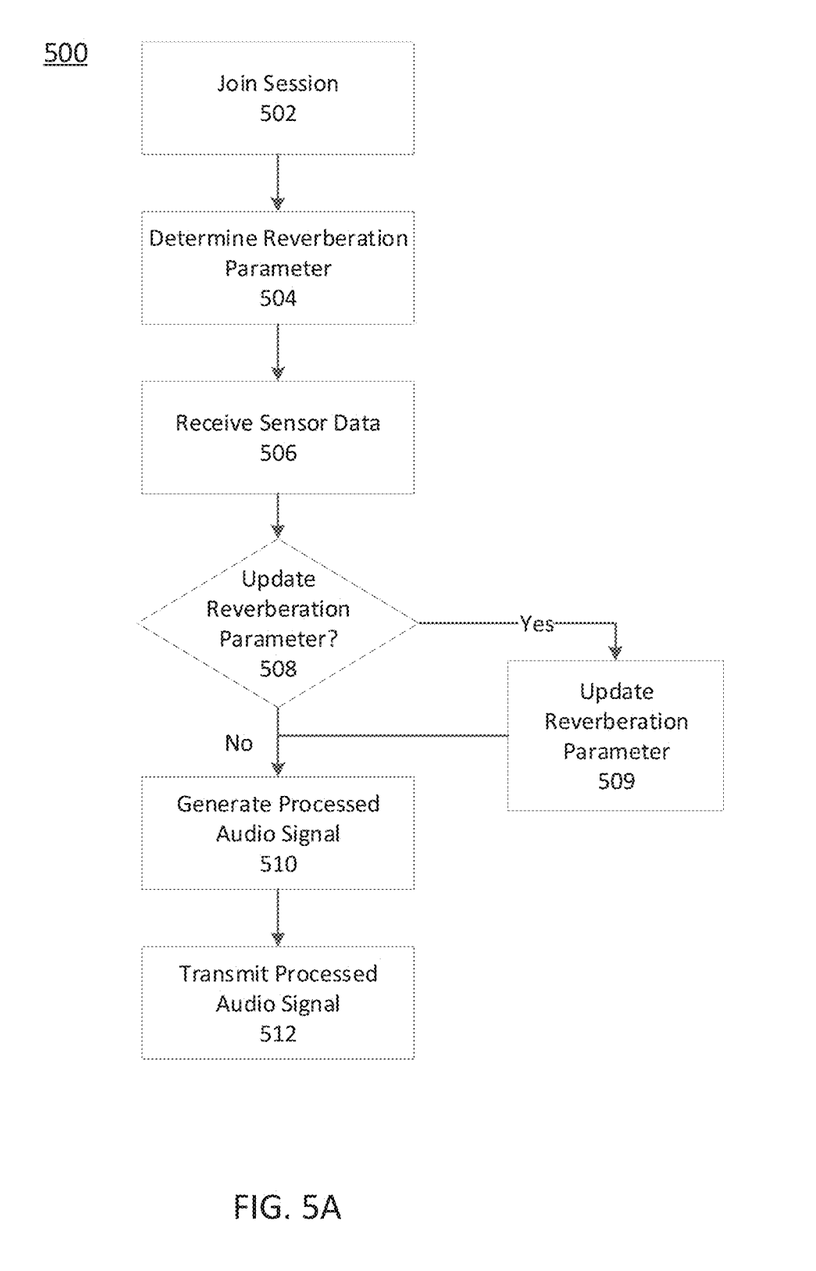
FIG. 5A is a flowchart of an exemplary process for conducting conference calls, consistent with disclosed embodiments.

FIG. 5A is a flowchart of exemplary process 500 for conducting conference calls, consistent with disclosed embodiments.

At step 502, consistent with disclosed embodiments, a call device joins a conference call session as a member of a call party, the call session being hosted by a call session server.

Figure 6:
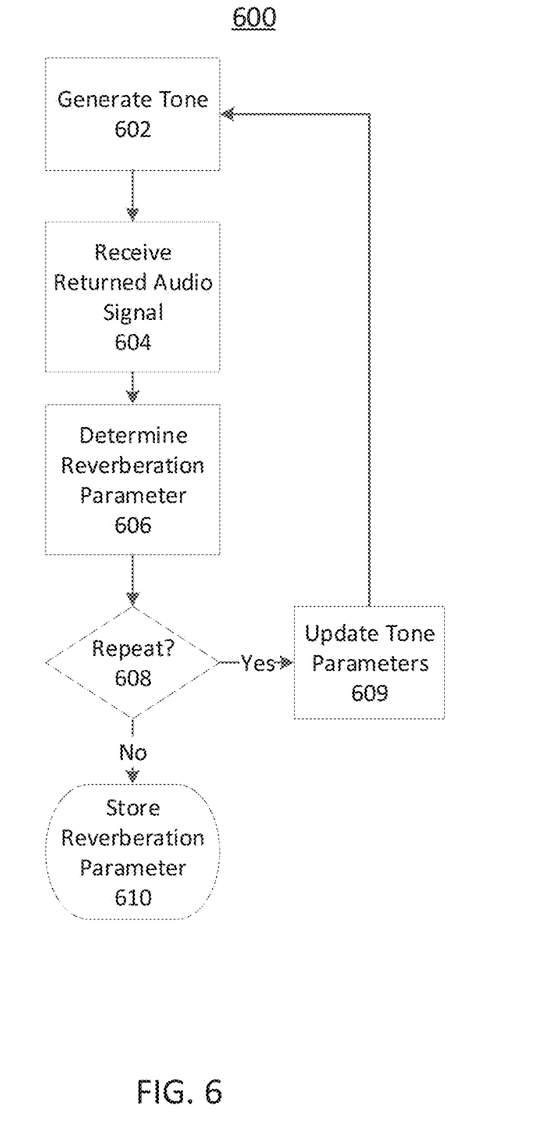
FIG. 6 is a flowchart of an exemplary process for measuring reverberation.

At step 504, the call device determines a reverberation parameter consistent with embodiments disclosed referring to reverberation module 244 or referring to FIG. 6. Determining a reverberation parameter may comprise generating a tone using a speaker, receiving a returned audio signal at the microphone in response to the tone, the microphone being associated with a location, and estimating the reverberation parameter based on the returned audio signal.

At step 506, the call device receives sensor data, consistent with disclosed embodiments referring to FIG. 2. Sensor data may comprise a received audio signal and received location data.

At step 508, the call device determines whether to update a reverberation parameter. In some embodiments, determining whether to update the reverberation parameter is based on the received audio signal, the received location data, a value of the reverberation parameter, or a duration of time. For example, in some embodiments, determining whether to update is based on a sound quality parameter of the received audio signal. In some embodiments, consistent with methods disclosed in reference to reverberation module 244, the value of the reverberation parameter is a reverberation time, and determining whether to update is based on a reverberation time that exceeds or does not meet a threshold time.

If the call device determines to update the reverberation parameter, the call device updates the reverberation parameter at step 509. Updating the reverberation parameter may comprise initiating an update and repeating steps 502 through 508.

If the call device determines not to update the reverberation parameter, the call device generates a processed audio signal at step 510 consistent with disclosures referring to FIG. 2.

In step 512, the call device transmits the processed audio signal to a call session server.

As one of skill in the art will appreciate, in some embodiments, the call device receives sensor data, processes audio signals, and transmits audio signals continuously once call device joins a session. That is, in some embodiments, one or more of steps 502 through 512 may be performed simultaneously.

Figure 5B:
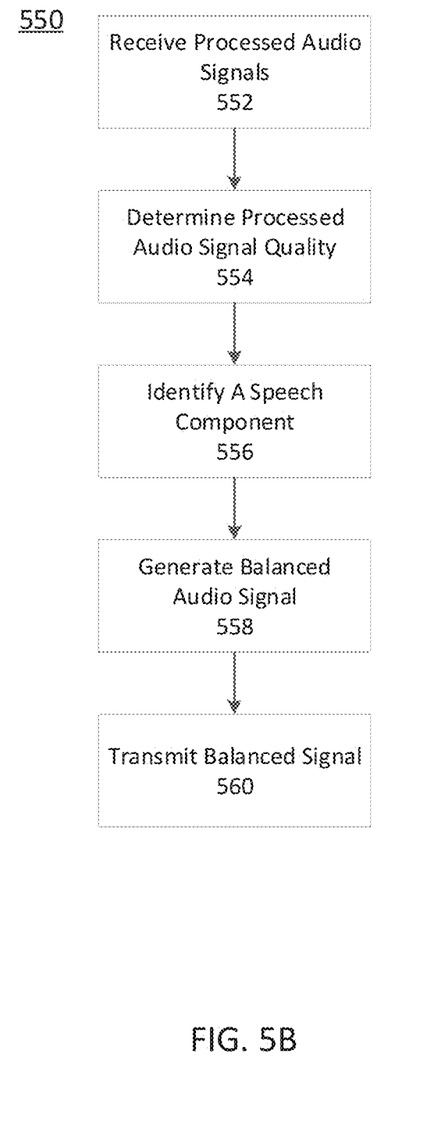
FIG. 5B is a flowchart of an exemplary processes for processing call signals at a server, consistent with disclosed embodiments.

FIG. 5B is a flowchart of exemplary processes 550 for processing call signals at a call session server, consistent with disclosed embodiments. In some embodiments, the process of FIG. 5B follows the process of FIG. 5A.

At step 552, a call session server receives a plurality of processed audio signals from a call device associated with a first call party.

At step 554, the call session server determines the sound quality of at least one of the plurality of processed audio signals, consistent with disclosures referring to FIG. 3. In some embodiments, step 554 comprises determining a first sound quality parameter of a first received audio signal. Step 554 may further comprise determining a second sound quality parameter of a second received audio signal.

At optional step 556, the call session server identifies a first speech component of a first processed audio signal, consistent with disclosures referring to FIG. 3. Step 556 may further comprise determining a second speech component of a second processed audio signal.

At step 558, the call session server generates a balanced audio signal corresponding to the first call party by performing methods disclosed referring to FIG. 3. In some embodiments, the balanced audio signal is based on at least one of a first processed audio signal or a second processed audio signal. In some embodiments, the balanced audio signal may be further based on at least one of a first sound quality parameter of the first processed audio signal or a second sound quality parameter of the second processed audio signal. In some embodiments, the balanced audio signal may be based on a speech component identified at step 556.

At step 560, the call session server transmits a balanced audio signal to a call device belonging to a second call party, consistent with methods disclosed referring to FIG. 3.

FIG. 6 is a flowchart of exemplary process 600 for measuring reverberation. In some embodiments, process 600 is consistent with disclosures made referring to FIG. 2.

At step 602, a call device generates a tone, consistent with disclosures made referring to reverberation module 244. For example, the call device may generate a tone comprised of a broadband random noise, a pseudo-random electrical noise, a pistol-shot noise, a spark gap impulse, a noise burst, a chirp, an impulse noise, a pink noise, an exponential sweep, a sinusoidal sweep, or other noise. In some embodiments, the tone may be based on a tone parameter specifying a component of the tone including, for example, a frequency, a loudness, a type of noise, or other tone parameter.

At step 604, in response to generating the tone, the call device receives a returned audio signal. Consistent with disclosed embodiments, the call device may receive the returned audio signal via one or more speakers, the speakers being co-located with the call device or remote speakers.

At step 606, the call device determines a reverberation parameter, consistent with disclosures referring to FIG. 2. For example, the call device may determine a reverberation time.

At step 608, the call device determines whether to repeat steps 602 through 606. In some embodiments the determination is based on at least one of a sound quality parameter of the returned audio signal and a value of the reverberation parameter. If, at step 608, the call device determines to repeat the reverberation parameter measurement, the call device proceeds to step 609. If, at step 608, the call device determines not to repeat the reverberation parameter measurement, the call device proceeds to step 610.

At step 609, the call device determines whether to update a tone parameter previously used at step 602. In some embodiments the determination is based on at least one of a sound quality parameter of the returned audio signal and a value of the reverberation parameter. Following step 609, steps 602 through 608 repeat.

At step 610, the call device stores the reverberation parameter to be used, for example, in reverberation module 244.

Systems and methods disclosed herein involve unconventional improvements over conventional conference call technologies. As compared to conventional technologies, embodiments of the invention improve audio quality and speech intelligibility, provide improved mobility, provide greater adaptability, and may be achieved at low cost.

Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

Computer programs based on the written description and methods of this specification are within the skill of a software developer. The various programs or program modules can be created using a variety of programming techniques. For example, program sections or program modules can be designed in or by means of Java, C, C++, NodeJS, C#, GO, Python, Ruby, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A call session system for conducting conference calls comprising:
   one or more hardware processors; and
   one or more memory units storing instructions executable by the one or more hardware processors to perform operations comprising:
      receiving, from a first call device belonging to a first party, a request to initiate a call session between the first party and a second party;
      initializing, in response to the request, a call session between the first party and the second party;
      transmitting, to the first call device, information for joining a call session;
      allowing the first party to join the call session;
      allowing the second party to join the call session;
      receiving, from the call first device, a first audio signal
      receiving, from a second call device belonging to the first party, a second audio signal;
      receiving, from one of the first or second call devices, a reverberation parameter;
      determining a first sound quality parameter of the first audio signal;
      determining a second sound quality parameter of the second audio signal;
      generating a balanced audio signal based on the first audio signal, the second audio signal, a dereverberation method using the reverberation parameter, the first sound quality parameter, and the second sound quality parameter; and
      transmitting, to a third call device belonging to the second party, the balanced audio signal.

2. The call session system of claim 1, the operations further comprising:
   generating an updated audio signal based on the first sound quality parameter and the first audio signal; and
   wherein the balanced audio signal is based on the updated audio signal.

3. The call session system of claim 2, wherein the updated audio signal is based on at least one of time-domain filtration, frequency domain filtration, spectral noise reduction, adaptive noise cancellation, adaptive broadband filtration, adaptive inverse filtration, frequency compensation, impulse filtration, dynamic processing, stereo processing, automatic gain control, acoustic shock protection, harmonic filters, or equalizer control.

4. The call session system of claim 1, wherein the first sound quality parameter is one of a loudness, a pitch, or a timbre.

5. The call session system of claim 1, wherein the balanced audio signal is further based on at least one of automatic level control, sound clipping, gain adjustment, a microphone array processing method, or another audio mixing method.

6. The call session system of claim 1, the operations further comprising:
   receiving first location data from the first call device;
   receiving second location data from the second call device; and wherein the balanced audio signal is further based on the first location data and the second location data.

7. The call session system of claim 6, wherein the balanced audio signal is a multi-channel balanced audio signal.

8. The call session system of claim 6, the operations further comprising:
receiving third location data from the third call device; and
receiving, from a fourth call device belonging to the second party, fourth location information; and
wherein generating the balanced audio signal comprises reproducing a three-dimensional sound field based on the location of first, second, third, and fourth location data.

9. The call session system of claim 1, the operations further comprising:
identifying a speech component of the first audio signal based on at least one of a logistic regression model, a Naïve Bayes and Sentiment Classification-based model, a Hidden Markov Model (HMM), dynamic time warping-based speech recognition, a neural network, a deep learning neural network, or an end-to-end automatic speech recognition.

10. The call session system of claim 9, the operations further comprising:
generating text based on the speech component; and
transmitting the text to at least one of the first call device, the second call device, or the third call device.

11. The call session system of claim 1, the operations further comprising:
generating a speech-enhanced audio signal based on the first audio signal and at least one of a linear filtration, a probabilistic filtration, or an independent component analysis,
wherein generating the balanced audio signal is further based on the speech-enhanced audio signal.

12. The call session system of claim 1, the operations further comprising:
changing the relative loudness of the first audio signal in the balanced audio signal.

13. The call session system of claim 12, wherein changing the relative loudness of the first audio signal is based on at least one of received location data or an identified speech component of the first audio signal.

14. The call session system of claim 1, wherein generating the balanced audio signal based on a dereverberation method using the reverberation parameter comprises processing the audio signal using at least one of a spatial coherence method, a time dependent coherent-to-diffuse power ratio method, or a frequency dependent coherent-to-diffuse power ratio method.

15. The call session system of claim 1, the operations further comprising:
allowing a third party to join the call session; and
transmitting the balanced audio signal to a call device belonging to the third party.

16. The call session system of claim 1, the operations further comprising:
sending a notification to at least one of the first call device, the second call device, or the third call device,
wherein the notification comprises at least one of a call status, a user availability status, or a user message.

17. The call session system of claim 1, wherein the call session system is implemented as part of a cloud service.

18. The call session system of claim 1, wherein initializing the session comprises performing operations based one of a telephone system protocol or an internet-based protocol.

19. A method for conducting a call session comprising:
receiving, by a call session system, from a first call device belonging to a first party, a request to initiate a call session between the first party and a second party, the request comprising at least one of contact information associated with a member of the first party and contact information associated with a member of the second party;
initializing, by the call session system, in response to the request, a call session between the first party and the second party;
transmitting, by the call session system, to the first call device, information for joining a call session;
allowing, by the call session system, the first party to join the call session;
allowing, by the call session system, the second party to join the call session;
receiving, by the call session system, from the call first device, a first audio signal;
receiving, by the call session system, from a second call device belonging to the first party, a second audio signal;
receiving, by the call session system, from one of the first or second call devices, a reverberation parameter;
determining, by the call session system, a first sound quality parameter of the first audio signal;
determining, by the call session system, a second sound quality parameter of the second audio signal;
generating, by the call session system, a balanced audio signal based on the first audio signal, the second audio signal, a dereverberation method using the reverberation parameter, the first sound quality parameter, and the second sound quality parameter; and
transmitting, by the call session system, to a third call device belonging to the second party, the balanced audio signal.

* * * * *